(12) United States Patent
Jaksic

(10) Patent No.: US 7,516,995 B2
(45) Date of Patent: Apr. 14, 2009

(54) METHOD FOR MANIPULATING OBJECTS

(75) Inventor: Nebojsa Ilija Jaksic, 24 Newpark Ln., Pueblo, CO (US) 81001

(73) Assignee: Nebojsa Ilija Jaksic, Pueblo, CO (US)

( * ) Notice: Subject to any disclaimer, the term of this patent is extended or adjusted under 35 U.S.C. 154(b) by 0 days.

(21) Appl. No.: 11/760,414

(22) Filed: Jun. 8, 2007

(65) Prior Publication Data

US 2008/0303299 A1    Dec. 11, 2008

(51) Int. Cl.
*B25J 15/06* (2006.01)
(52) U.S. Cl. .................................. 294/64.3
(58) Field of Classification Search ............ 294/64.1, 294/64.3; 901/40; 414/752.1
See application file for complete search history.

(56) References Cited

U.S. PATENT DOCUMENTS

| | | | |
|---|---|---|---|
| 4,118,058 A * | 10/1978 | Rahn et al. ............... 294/64.3 |
| 4,502,721 A * | 3/1985 | Savin-Czeizler et al. ..... 294/1.1 |
| 4,903,717 A * | 2/1990 | Sumnitsch ................. 134/99.1 |
| 4,921,520 A * | 5/1990 | Carlomagno ................ 65/111 |
| 5,066,058 A * | 11/1991 | Guyard ....................... 294/1.1 |
| 5,067,762 A * | 11/1991 | Akashi ...................... 294/64.3 |
| 5,169,196 A * | 12/1992 | Safabakhsh ................ 294/64.3 |
| 6,099,056 A * | 8/2000 | Siniaguine et al. ......... 294/64.3 |
| 6,517,130 B1 * | 2/2003 | Donoso et al. ............. 294/64.1 |
| 6,601,888 B2 * | 8/2003 | McIlwraith et al. ........ 294/64.3 |

* cited by examiner

*Primary Examiner*—Dean J Kramer

(57) ABSTRACT

A method and an apparatus for the manipulation of objects are provided, comprising steps of creating a low pressure zone between a plate with a gas-flowing surface and an object to be manipulated. This gas is forced to flow between the surface of the plate and the object. The low-pressure zone created between the surface and the object results in a force acting on the object and towards the plate. By moving the plate the object is moved. The method and apparatus are easy to implement and provide contact manipulation of objects.

4 Claims, 2 Drawing Sheets

METHOD FOR MANIPULATING OBJECTS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION—FIELD OF THE INVENTION

This invention relates to the manipulation of objects. It relates especially to a method for manipulating objects.

BACKGROUND OF THE INVENTION—DISCUSSION OF PRIOR ART

After an extensive patent search and an extensive search of other relevant literature in engineering journals and books, this inventor did not find anything applicable to this invention. There is no prior art dealing with contact object manipulating by employing low-pressure zones created by pressurized gas flow.

It would be advantageous to have a simple, low-cost method for the manipulation of objects of irregular shapes that are hard to manipulate by other methods. It would be further advantageous to have a simple, low-cost method for the manipulation of porous objects. It would be further advantageous to have a simple, low-cost method for the manipulation of objects in automated operations that are more flexible than other methods so that the use of other object feeders/sorters can be reduced or even eliminated.

BACKGROUND OF THE INVENTION—OBJECTS AND ADVANTAGES

It is one object of this invention to provide a simple and inexpensive method for the manipulation of irregularly-shaped objects.

It is another object of this invention to provide a simple and inexpensive method for the manipulation of porous objects.

To achieve these objects of the invention, a method for the manipulation of objects is provided, comprising first placing an apparatus, a Bernoulli pickup, in contact with the object to be manipulated, then supplying a gas flow through the nozzle of the apparatus thus creating negative pressure between the plate of the apparatus in contact with the object and the object and therefore creating an attractive force between the two which is strong enough to move the object when the apparatus is moved. Preferably, during the manipulation of an object when the manipulated object is an irregularly shaped object, the object is in contact with the apparatus.

The present process can manipulate objects having either porous or solid surfaces.

BRIEF SUMMARY OF THE INVENTION

In accordance with one embodiment of this invention, a contact method for the manipulation of irregularly shaped objects using low pressure between the object and a Bernoulli pickup is disclosed. In accordance with the practice of the invention, gas flow introduced by a gas-carrying member into the space between the surface of the plate in contact with the object and the object to be manipulated creates a low-pressure zone and therefore a force between the object and the surface of the plate allowing contact manipulation of the object.

BRIEF DESCRIPTION OF THE SEVERAL VIEWS OF THE DRAWING

Other objects and advantages of the present invention will become apparent from a detailed description of preferred embodiments of the invention, which follows. Reference will be had to the accompanying drawings in which.

DRAWINGS

Reference Numerals

Figure 1A:
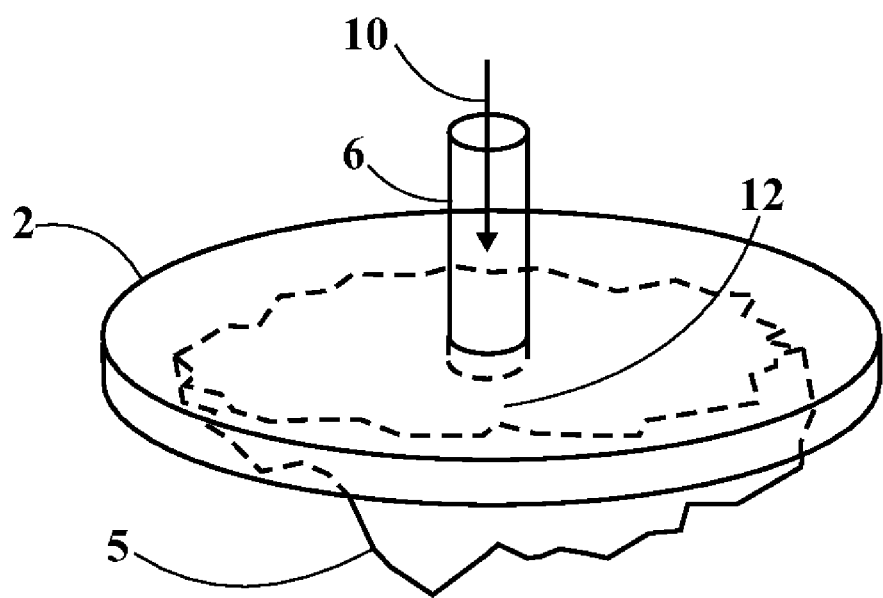
FIGS. 1A and 1B are perspective and front views showing an apparatus, a Bernoulli pickup, in contact with an irregularly-shaped object and showing the plate having a concave surface in contact with the object prepared to practice the process of the present invention.

2—plate
5—irregularly-shaped object
6—gas-carrying member
8—gap
10—direction of gas flow
12—nozzle

DETAILED DESCRIPTION OF THE PREFERRED EMBODIMENTS

FIGS. 1A, 1B, 2A and 2B are illustrations of an apparatus suitable for the practice of the present invention including an irregularly-shaped object 5. To manipulate an irregularly shaped object 5, plate 2 is placed in contact with object 5. Then, a gas is supplied in the direction of the gas flow 10 through gas-carrying member 6 and nozzle 12. Gas flow between plate 2 and object 5 creates negative pressure between them causing a force between plate 2 and object 5. By moving plate 2, object 5 also moves with the plate. At the end of the manipulation, object 5 is released from the apparatus by sufficiently reducing or switching off the gas supply to gas-carrying member 6.

By adjusting one or more process conditions of the present invention, such as the gas flow, the plate surface type, shape and area, nozzle shape and dimensions the process can be optimized for maximum attraction force between the plate and the object. It is relatively easy for one skilled in the art to provide manual or automatic control of the gas flow by changing the inner diameter of the gas-carrying member, the size and type of nozzle, the gas pressure, and/or the plate surface size, surface finish and/or flatness.

This inventor has completed several runs in accordance with the process of the present invention. The following examples present detailed descriptions of an embodiment of the present process. The detailed description falls within the scope of, and serves to exemplify, the more generally described process set forth above. The example is presented for illustrative purposes only, and is not intended as a restriction on the scope of the invention.

EXAMPLE

Figure 2A:
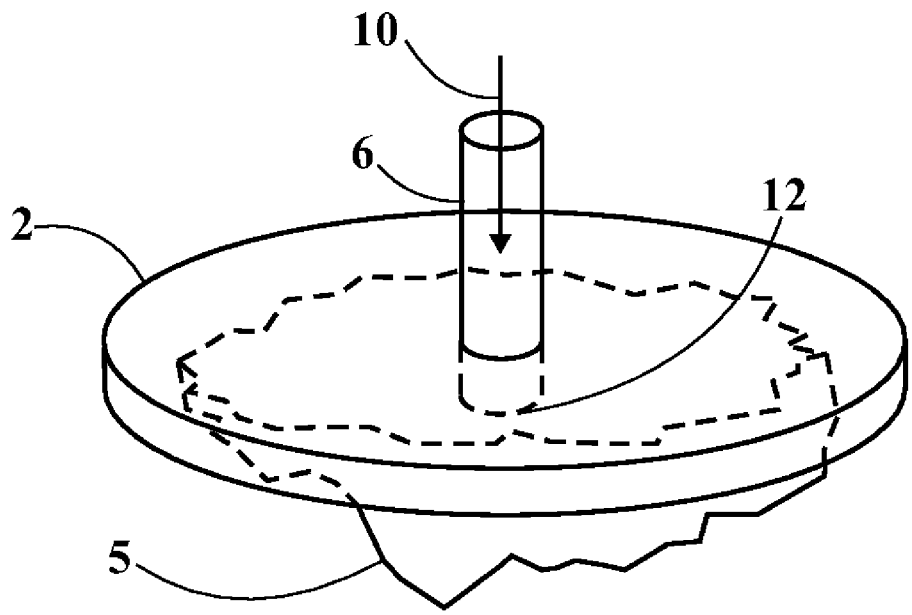
FIGS. 2A and 2B are perspective and front views showing an apparatus, a Bernoulli pickup, in contact with an irregularly shaped object prepared to practice the process of the present invention.
Figure 2B:
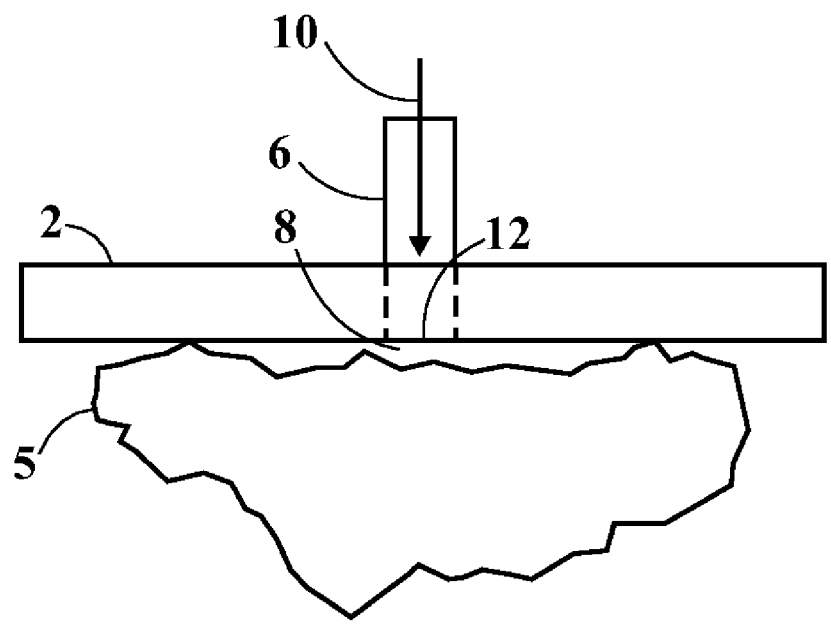

This example describes the manipulation of irregularly-shaped objects in contact with a Bernoulli pickup. The apparatus of FIG. 2A is connected to shop air via a filter lubricator regulator (FRL) unit, a pneumatic on/off valve, and a pneumatic hose. The regulator is adjusted to a desired air pressure. Plate 2, with dimensions of about 6×6×0.5, made of aluminum and having a flat bottom surface, is used. According to FIGS. 2A and 2B, the apparatus is placed on the top of the object to be manipulated. This inventor used a number of irregularly shaped objects of various shapes, weights, and sizes. Then, by switching on the pneumatic valve, air pressures of about 30 PSI to about 100 PSI are applied through the about 0.25-inch inner diameter gas-carrying member of the apparatus. The force created between the bottom surface of plate 2 and object 5 due to the gas flow between them allows lifting object 5 by lifting the apparatus. In addition, irregularly shaped objects from about 100 grams to about 200 grams can be tilted from about 4 degrees to about 11 degrees using air pressures from about 40 PSI to about 80 PSI during manipulation.

Figure 1B:
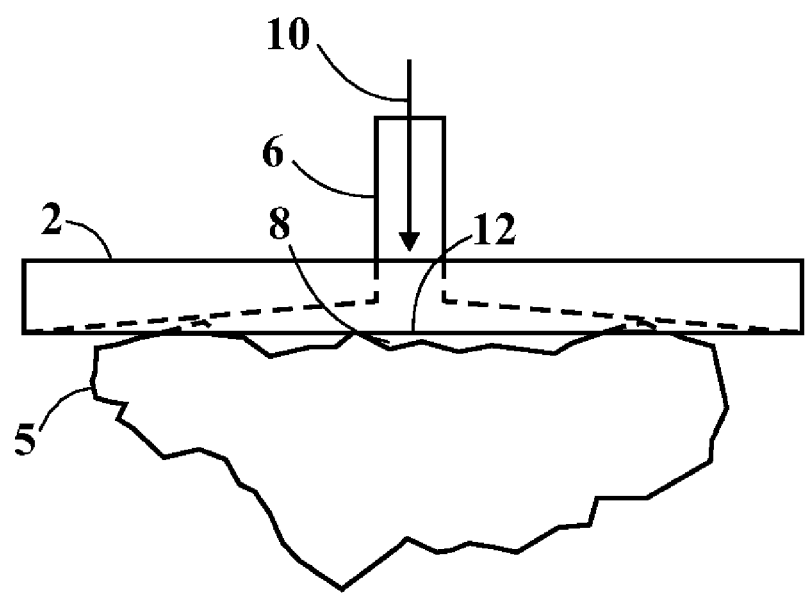

When a concave surface, as exemplified in FIGS. 1A and 1B, having a concavity angle of about 3 degrees is used for the bottom surface of plate 2, the force between the bottom surface of plate 2 and object 5 is increased. During manipulation, irregularly-shaped objects from about 100 grams to about 200 grams can be tilted from about 10 degrees to about 35 degrees using air pressures from about 40 PSI to about 80 PSI.

CONCLUSIONS, RAMIFICATIONS, AND SCOPE

According to one embodiment of this invention, I have provided a simple method for contact manipulation of objects undisclosed in the prior art. Gas flow is used to create an attraction force between the apparatus and the object to be manipulated.

The above embodiments of the current invention have additional advantages in that
 a) they can manipulate a wide variety of objects without the need for complicated apparati or retooling; and
 b) they can manipulate objects having porous surfaces.

Although the description above contains much specificity, this should not be constructed as limiting the scope of any embodiment, but as exemplifications of the presently preferred embodiments thereof. Many other ramifications and variations are possible within the teachings of the various embodiments. For example, one skilled in the art could use a cylindrical plastic plate as plate 2 of FIGS. 1A, 1B, 2A, and 2B, could provide a continuous flow control valve instead of an on/off valve as disclosed, could rotate the apparatus to pull the object in a desired direction, or one could add structural members to restrict any sliding motion of the object. Thus the scope of the invention should be determined by the appended claims and their legal equivalents, and not by the examples given.

I claim:

1. A process using a Bernoulli pickup for contact manipulation of objects having at least one non-flat surface, comprising:
    a. providing a flat plate having at least one through hole; and
    b. providing a supply of positive pressurized gas; and
    c. providing a means to control the flow of said positive pressurized gas through said through hole; and
    d. providing an object having at least one non-flat surface; and
    e. bringing said flat plate into contact with said non-flat surface of said object; and
    f. supplying said positive pressurized gas through said through hole; then
    g. moving said flat plate with said non-flat surface of said object remaining in contact with said flat plate thus moving said object; then
    h. manipulating said object to a desired position; then
    i. decreasing the flow of said positive pressurized gas through said through hole thus releasing said object,
whereby said flat plate with said through hole allows said positive pressurized gas to flow between said flat plate and said object creating a low pressure zone between them thus creating an attractive force between them due to the Bernoulli effect.

2. The process of claim 1, wherein said pressurized gas is air.

3. The process of claim 1, wherein said flat plate has a slightly concave surface in contact with said object.

4. The process of claim 1, wherein the said object is porous.

* * * * *